Sept. 20, 1932.  W. E. SCHIRMER  1,878,332
MULTIOVEN HEAT REGULATOR
Filed March 4, 1932   2 Sheets-Sheet 1
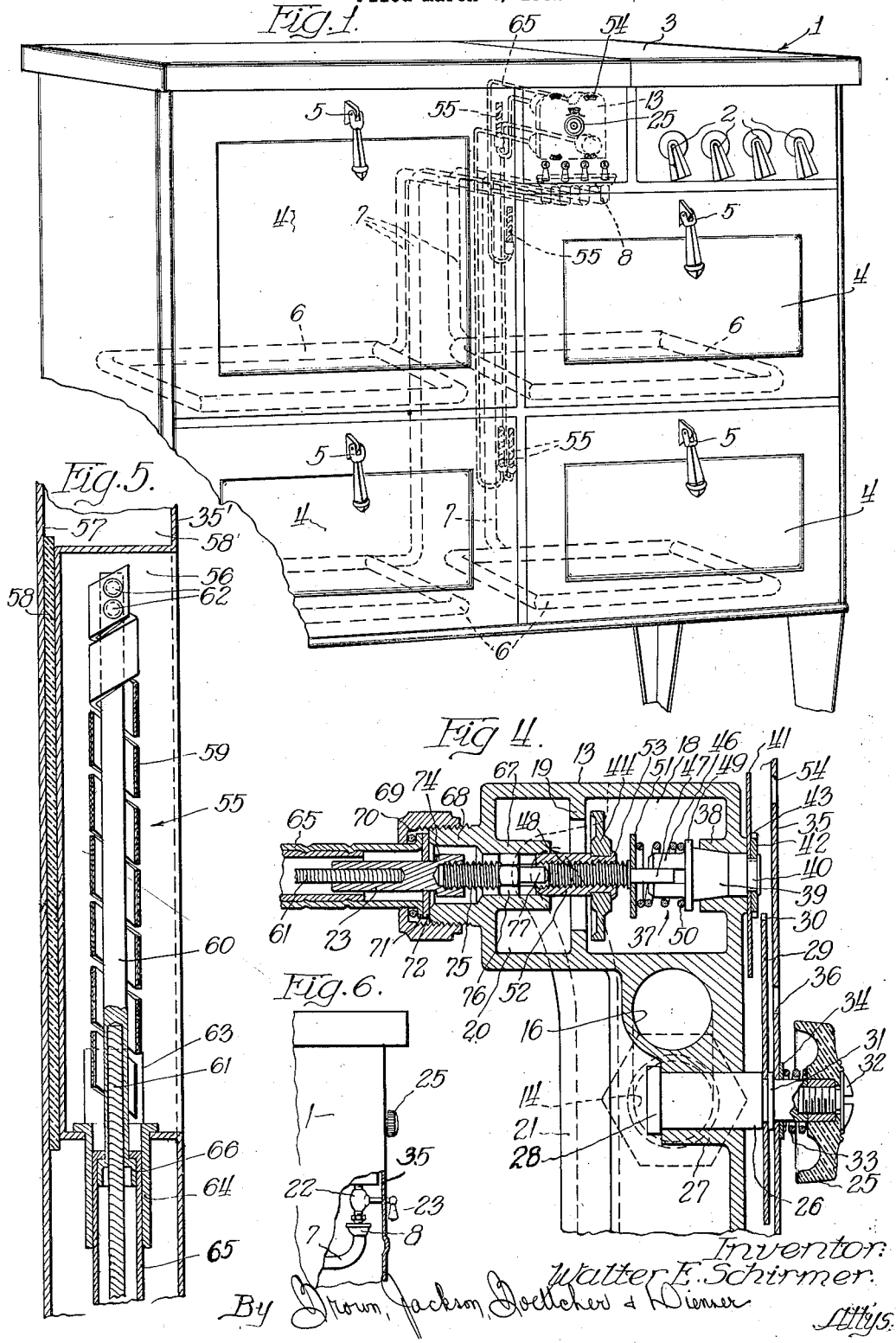

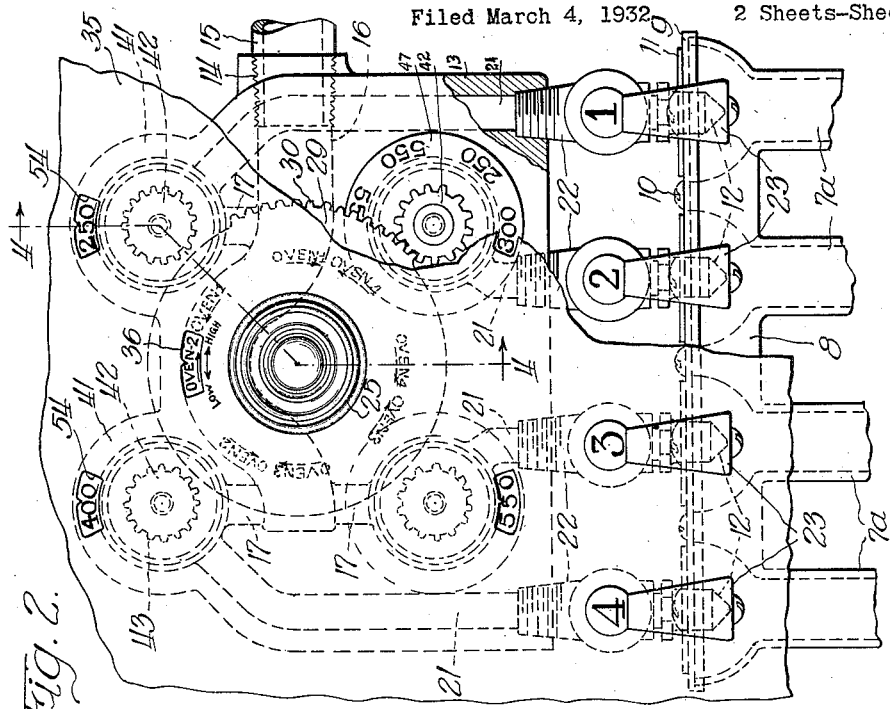
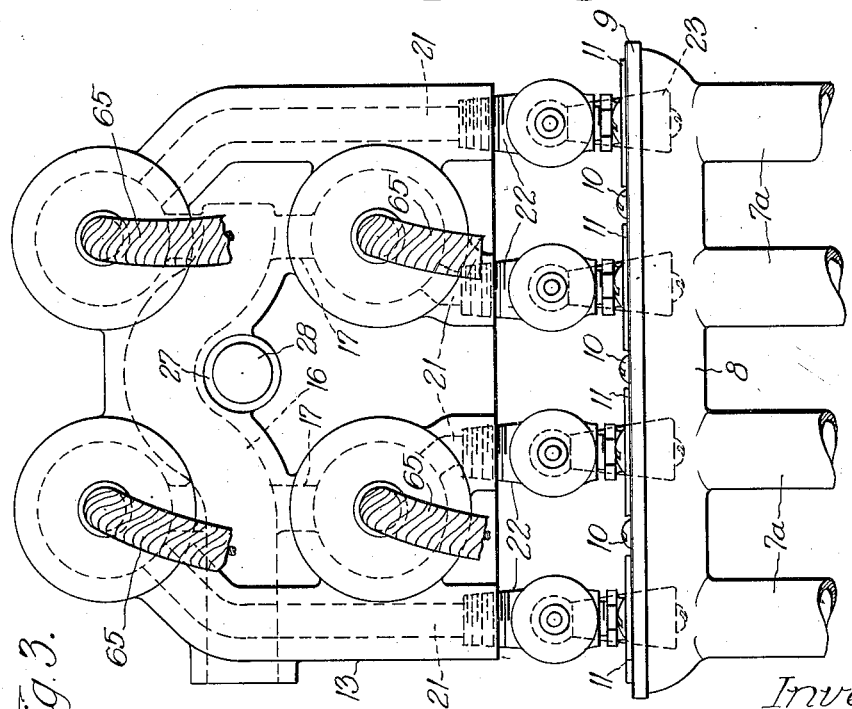

Patented Sept. 20, 1932

1,878,332

UNITED STATES PATENT OFFICE

WALTER E. SCHIRMER, OF CHICAGO, ILLINOIS, ASSIGNOR TO MILWAUKEE GAS SPECIALTY COMPANY, OF MILWAUKEE, WISCONSIN, A CORPORATION OF WISCONSIN

MULTIOVEN HEAT REGULATOR

Application filed March 4, 1932. Serial No. 596,694.

This invention relates to heat regulators, and more particularly to heat regulators for controlling a plurality of ovens or chambers, operating at the same or at different temperatures.

The preferred embodiment of the present invention is shown in connection with an oven having a plurality of oven chambers, such as a baking oven, wherein each of the chambers is operating at a different temperature in accordance with the particular baking operation being carried on therein. It is to be understood, however, that the invention is equally applicable to enameling and japanning ovens, and to ovens used in connection with the carrying out of various chemical processes, also, to ovens such as drying ovens, and the like.

One of the main features of the present invention resides in the provision of a single selecting mechanism for determining the temperatures desired in each of a plurality of individual oven chambers, this selecting mechanism being capable of varying the temperature within each of the individual oven chambers without influencing the temperature setting of the remaining chambers.

A further feature of the present invention is the provision of flexible conveying means disposed between thermally sensitive means positioned adjacent each of the oven chambers, and the valve control means for permitting flow of fuel to the oven burners, whereby each of the ovens is automatically maintained at the desired preselected temperature.

In the heat regulator of the present invention, the selecting mechanism comprises a selecting knob and dial member, the dial member being provided with gear teeth extending over a small portion of its periphery. Upon actuation of the knob, the dial member is selectively engaged with any desired similarly-geared dial member controlling the fuel supply for an individual oven. Thus, the second dial member is rotated until the desired temperature indication is observed, the dial member carrying suitable temperature markings visible through a small opening formed in the exterior wall of the oven. This rotation operates the fuel supply valve controlling the supply of fuel to the burner in the corresponding oven chamber. After the fuel valve has thus been actuated, the thermally sensitive means positioned adjacent the corresponding oven chamber automatically maintains the desired temperature within this chamber. This operation may be repeated for each of the individual oven chambers without influencing or changing the setting of the other chambers.

The regulator is adapted to be disposed within the interior of the oven, and has all its parts, except the main selecting knob and the gas cocks which control the flow of gas to the corresponding oven chambers, hidden from view. Suitable openings are provided in the exterior oven wall for registering with the indicating dial of each oven chamber, and with the main selecting dial, to indicate the positions of these members to the operator.

The heat regulator, containing the inlet from the fuel supply line, and the outlets leading to the different oven chambers, is adapted to be formed as an integral single unit, and is provided with suitable individual inlet and outlet chambers, controlled by regulatable valve means, for regulating the flow of fuel to the burners in the corresponding oven chambers. Also, the mixing chamber, provided for mixing the gaseous fuel with air to form a combustible mixture for the burners in each of the chambers, is formed as an integral cast unit. It is thus apparent that the design and construction of my novel heat regulator is relatively simple and requires few moving parts. The regulator is capable of being installed in any of the usual types of ovens, and requires no modification or change to adapt itself to these ovens.

A further advantage of the present invention is the disposition of the thermally sensitive control means within the interior oven wall adjacent the respective oven chambers, which decreases the length of the tubing required for the conveying means, and also provides a compact and simplified construction that may be easily installed, and which is flexible enough to permit optional arrangements within any desired type of oven.

Further objects and advantages of my invention will appear more fully from the following detailed description, which, taken in connection with the accompanying drawings, will disclose to those skilled in the art the construction and operation of the preferred form of my invention.

In the drawings:

Fig. 1 is a perspective view of an oven provided with my novel heat regulator;

Fig. 2 is an elevational view, with parts broken away, showing in detail the regulator unit and the associated dial members;

Fig. 3 is a rear elevational view of the regulator unit shown in Fig. 2;

Fig. 4 is a sectional elevational view taken substantially on the line 4—4 of Fig. 2, looking in the direction indicated by the arrows;

Fig. 5 is a sectional elevational view of the thermally sensitive means mounted in the interior wall of the oven chamber; and Fig. 6 is a fragmentary elevational view, with parts broken away, showing the mounting of the regulator within the oven.

While I have shown the preferred form of the present invention embodied in an ordinary type of gas oven used for baking operation, with the regulator unit controlling the temperatures in each of the four oven chambers, I wish it understood that the regulator is equally applicable to any desired number of oven chambers, and to a great variety of other types of ovens or heating devices, and that this embodiment is shown by way of illustration only.

Referring now in more detail to the drawings, Fig. 1 shows a perspective view of an oven provided with the heat regulator, the oven being indicated generally by the reference numeral 1. This oven is of the type known as a "table top" type of oven, and is provided with a plurality of open top grate burners, controlled by the gas cocks indicated at 2, which burners are accessible when the hinged cover 3 is opened. The remaining portion of the oven is divided into a plurality of oven chambers, each indicated by the reference numeral 4.

Each of these oven chambers is provided with a hinged door, and with a suitable locking mechanism, controlled by the handle 5, which is mounted upon the door for holding the door in closed position during operation of the oven.

Within each of the ovens 4 there is provided an oven burner 6, this burner being of the usual type provided with a plurality of ports which are adapted to allow jets of flame to issue therefrom for providing the heating means within the oven. For the sake of convenience, I have numbered each of the oven chambers, the number being shown upon the doors of the respective chambers.

Each of the oven burners 6 is provided with a suitable conduit leading from the burner to the mixing chamber, these conduits being indicated by the reference numeral 7. These conduits 7 serve to conduct the combustible mixture formed in the mixing chamber 8 to the respective burners 6 disposed in the ovens 4, and are positioned within the interior oven wall that extends vertically between ovens Nos. 1 and 2 and ovens Nos. 3 and 4.

Referring now in more detail to Figs. 2 and 3, the conduits 7 enter the gas mixing chamber 8, this mixing chamber being formed of an integral cast metal section, and being provided with projecting portions 7a adapted to be connected to the conduits 7. The mixing chamber 8 is provided with a cover plate member 9 suitably secured over the face thereof by means of the screws 10.

Positioned over the opening leading to each of the individual mixing chambers formed in the member 8 is a suitable slotted member 11 which is adapted to be rotatably adjusted for varying the proportions of air admixed with the gas flowing into the mixing chamber.

Suitable Venturi tips, leading from the regulator unit, are indicated by the numeral 12 in Fig. 2, and are adapted to project the gas into the mixing chamber to be mixed with the proper proportions of air for forming a combustible mixture.

Referring now more particularly to the regulator unit, this unit is indicated generally by the reference numeral 13, and comprises a cast integral body portion, shown more clearly in Fig. 3. The body portion has formed therein suitable threads, indicated at 14, for receiving the threaded end of a fuel supply pipe 15. This fuel supply pipe leads from the gas manifold which is connected by the open or grate burners 2 to the regulator unit, and conducts the supply of gaseous fuel to the regulator unit. The interior of the unit is provided with a main channel, indicated generally at 16, which is provided with individual projecting channels 17 leading to each of the valve chambers for the individual ovens.

Referring now to Fig. 4, the projecting individual channels 17 lead into an inlet chamber 18 formed in the unit 13. Suitable valve means positioned in this inlet chamber serve to permit fuel to flow past an internal partition wall 19 into an outlet chamber 20 connected thereto. From the outlet chamber 20 the gas passes through a suitable outlet port into the tubing 21 leading to the mixing chamber.

Interposed between the tubing 21 and the mixing chamber 8 are the gas cocks, indicated at 22, for controlling the flow of gas to each of the individual burners. These gas cocks carry identifying numbers for indicating to the operator the respective chamber which each cock controls. Suitable operating handles 23 extend through the oven wall to the exterior portion of the oven and are adapted to be rotated to permit gas to flow from the tubing or conduits 21 through the gas cock 22 to the Venturi tips 12 disposed within the mixing chamber formed in the member 8.

Thus it is apparent that gas flows from the supply manifold 15 through the channel 16 into the individual channel 17 leading to the valve control means. It then passes from the inlet chamber 18 of these valve control means past the partition wall 19 formed in the housing or unit 13 into the outlet chamber 20. From the outlet chamber the gas passes through an outlet port into the conduit 21 leading to the gas cocks 22. Operating handles 23 determine which of the ovens is in operation the gas flowing through the cock and being projected out through the Venturi tips 12 into the mixing chambers carried in the member 8. From the mixing chambers the gas and air mixture passes through the projecting conduit portion 7a and down through the conduits 7 to the respective oven burners 6 mounted in each of the ovens 4.

Considering now in more detail the selecting mechanism and the associated valve means for controlling the flow of fuel to the oven burners, I preferably provide a main control selecting knob or hand wheel, indicated at 25, which is mounted upon a suitable shaft or spindle 26.

The spindle has an enlarged end portion 28 for preventing withdrawal thereof when mounted in position.

Secured about a narrowed portion of the spindle 26 is a suitable selecting dial member 29, which is provided at one portion of its periphery with extending gear teeth 30. The dial is secured about the spindle and is frictionally engaged therewith by means of an annular flanged washer member 31 which bears against the dial.

The extending portion of the spindle 26 is provided with a suitably threaded recess for receiving an adjusting screw 32 for securing the hand wheel or selecting knob 25 to the spindle. A suitable spring member bears against the inner surface of the hand wheel 25 and has its other end biased against a washer 34 secured about the spindle and bearing against the outer face of the oven wall 35.

This oven wall 35 is provided with a suitable opening 36 formed therein for permitting the operator to view the indicating markings formed on the face of the dial 29. It is to be observed that the spring member 33 normally urges the spindle 26 outwardly away from the regulator unit, forcing the flanged or enlarged end portion 28 into contact with the bearing portion 27 of the housing 13.

Disposed within each of the chambers 18 of the housing 13 is a valve mechanism indicated generally by the reference numeral 37. The housing 13 is provided with a bearing portion 38 and the valve stem or spindle 39 extends therethrough. The outer end of the spindle 39 is provided with a narrowed portion 40, and an individual dial member 41 is positioned thereabout. The dial member 41 carries temperature markings, which extend about the periphery thereof, as more clearly shown in Fig. 2. These markings or temperature indications range from the lowest temperature desired in each of the outer chambers to the highest, and preferably range from 250 to 550 degrees. Concentric with the dial member 41 is a gear member 42, which is secured in abutting engagement therewith, the member 40 having its end turned over to engage the outer surface of the gear 42 to secure it in non-rotating engagement with the spindle 39. The gear teeth 43 carried by the gear 42 are adapted to mesh with the teeth 30 carried by the dial member 29 when the selecting mechanism is pressed inwardly against the pressure of the spring 33.

Upon rotation of the selecting mechanism, the teeth 30 will engage with the teeth 43 to rotate the valve spindle 39, thus controlling the position of the valve member 44 carried within the inlet chamber 18, this member 44 being adapted to seat upon a suitable valve seat formed in the partition wall 19.

The valve mechanism 37 is adapted to be controlled by the rotation of the spindle member 39. This member 39 is provided with a slotted inwardly projecting end portion 46, which receives the corresponding tongue portion 47 formed integral with the threaded spindle member 48. The spindle 39 is provided with a collar member 49 which extends annularly about the slotted portion 46, and which is adapted to serve as a seat for one end of a helical spring member 50.

The other end of the spring member 50 is biased against an annular washer 51 secured about the tongue portion 47 of the spindle 48 and bearing against a shoulder formed on the spindle. The spring 50 tends to force the member 47 outwardly from the slotted portion 46 of the spindle 39, thus tending to maintain the valve in closed position.

The valve member 44 is carried upon a sleeve member 52, and is preferably seated in an annular recess formed therein, the end 53 of the sleeve member being turned over to frictionally secure the valve member 44 for preventing rotation thereof about the sleeve member. The sleeve member 52 is threaded internally to receive the spindle 48, and rotation of the spindle 39 serves to engage the tongue 47 in the slotted portion 46 for rotating the spindle 48, this rotation in turn causing the sleeve member to be moved laterally along the spindle for controlling the position of the valve member 44.

It is thus apparent that the setting of the valve member 44 can be controlled by the rotation of the gear 42 when it is engaged by the gears 30 carried by the valve member 29. Thus, in operation, the selecting mechanism is forced inwardly to engage the teeth 30 in the teeth 43 of the gear 42, and the spindle 39 is then rotated until the dial marking corresponding to the temperature desired within the oven appears through the opening 54 formed in the oven wall 45.

Similarly, each of the individual inlet chambers 18 may be controlled by the selecting mechanism, since the gear teeth 30 are carried upon only a small portion of the periphery of the dial member 29, and are engaged only upon forcing of the selecting mechanism inwardly against the pressure of the spring 33. Thus it is possible to rotate the selecting mechanism without engaging the teeth 30 until the proper oven indication appears at the opening 36, and to then force the selecting mechanism inwardly to engage the teeth 30 with the corresponding teeth carried by the dial controlling the valve in the particular oven selected. The selecting mechanism is then rotated until the proper temperature indication appears at the opening corresponding to the oven being controlled.

Thus it is apparent that after the proper valve setting has been determined by the selecting mechanism, the gas cock 23 controlling the particular oven may be opened, and gas will flow through the inlet 16 and through the conduit 17 individual to the particular oven desired through the inlet chamber 18 to the outlet chamber 20 and thence through the mixing chamber to the particular oven burner which is being operated. The valve member 44 controls the quantity of fuel flowing to the particular oven burner, and thus controls the temperature within the respective oven.

If, for any reason, the temperature within the particular oven is not in accord with the temperature setting determined by the selecting mechanism, the valve 44 will be automatically controlled for compensating for variations of temperature so that the desired temperature will be maintained. This is made possible by the provision of suitable thermal compensation means, indicated generally by the reference numeral 55, which are positioned in the inner side walls of each of the oven chambers 4.

This mechanism is positioned in a recess 56 formed in the inner lining wall 35' of the oven, this lining wall being bent outwardly to form an elongated rectangular recess extending practically the full distance between the outer oven wall 57 and the inner lining wall 35'. Suitable sheets of insulating material, indicated at 58, which may be asbestos, fiber board or the like, are positioned between the rear of the lining wall and the outer wall 57, so that no heat will be lost from the oven because of the lack of the air insulating chamber 58' which normally is provided between the outer oven wall and the lining wall.

The thermal or compensating device comprises a thermally sensitive member 59, which is helically coiled about a standard or post 60, the post 60 being recessed at its lower end to receive a flexible steel cable 61, commonly known as a "bowden" cable. At its upper end, the thermally sensitive member 59 is secured to the post by means of a pair of rivets or other suitable securing means 62. At its lower end the thermally sensitive element 59 is secured to an upstanding support 63 which seats upon the bushing or sleeve member 64 positioned in the lower or bottom portion of the recess 56. A suitable conduit or tubing 65 is provided, which fits about the enlarged end portion 66 of the post 60, and which is suitably secured thereto and also to the sleeve or bushing 64.

It will be apparent that variations of temperature within any of the ovens 4 will produce elongation or contraction of the thermally sensitive member 59, and this elongation or contraction will be effective to produce movement of the post 60. This movement of the post 60 will be transmitted to the flexible cable 61, which leads through the conduit 65 to the outlet chamber 20 of the housing 13.

The outlet chamber 20 is provided with both inwardly and outwardly extending bushing or bearing positions, these portions being indicated respectively by the numerals 67 and 68. The outwardly projecting portion 68 is threaded to receive a suitable cap member 69 which is recessed as at 70 for receiving the radially flanged end 71 of the tubing 65. An annular spacing washer 72 is provided between the end 71 of the tubing 65 and the marginal edge of the extending portion 68. The cap member 69 is threaded inwardly upon the portion 68 to hold these members securely in position.

The annular washer 72 provides a bearing for the sleeve member 73, this member being internally recessed to receive the projecting end of the cable 61. The opposite end of the sleeve member 73 is enlarged as indicated at 74, and is provided with a suitably extending stud 75 threaded therein. The stud 75 is provided with a guide portion 76, which may or may not be integral therewith, and from which extends a suitable pin portion 77 adapted to have abutting engagement with the end of the threaded spindle 48. The sleeve member 52 has sliding engagement within the inwardly extending portion 67 of the housing 13, as has the guide member 76, and the entire assembly is concentrically aligned.

It will be apparent that variations in temperature will produce longitudinal movement in the cable member 61, which in turn will cause longitudinal movement of the sleeve member 73. This movement of the sleeve member 73 will cause the projecting pin portion 77 to engage the valve assembly for lateral movement thereof, the valve assembly sliding, by means of the tongue 47, within the slotted portion 46 of the spindle 39. Thus, after the valve has once been positioned, its position may be changed by variations in the temperature existing within the oven, this variation being transmitted to the valve by means of the cable 61.

Upon increase in temperature, the thermally sensitive member 59 will expand, causing upward vertical movement of the post 60, which will result in the cable 61 drawing upon the sleeve member 73 to release the pin 77 from engagement with the valve assembly. The spring 50 will then force the valve 44 downwardly toward its valve seat, this movement being limited by the relative amount that the cable 61 is drawn upwardly by the post 60.

If the temperature within the oven drops lower than that desired by the setting of the selecting mechanism, the thermal sensitive member 59 will contract, causing downward vertical movement of the post 60, and consequently the cable 61 will force the sleeve member 73 inwardly to force the valve assembly, comprising the sleeve 52 and the valve member 44, against the pressure of the spring 50 outwardly away from the valve seat, thus permitting more gas to flow through the chamber 18 to the chamber 20, and thus allowing more fuel to reach the oven burners.

It will thus be apparent that, after the valve mechanism has once been set, there is an automatic regulation of the valve setting in accordance with the temperature existing within the oven, thus providing for the maintenance of a constant preselected temperature therein.

As above pointed out, each of the ovens is connected to an individual valve mounted in the housing 13, and each of the ovens is separately regulated by means of the selecting mechanism. In the operation of the oven, the selecting mechanism is rotated until the dial member 29 reaches a position at which the proper oven indication will appear through the opening 36. Immediately below this opening I have provided an indication upon the face of the oven wall showing the direction in which the selecting mechanism is to be rotated to either increase or decrease the temperature within the oven. Thus, after the desired oven indication has appeared, the selecting mechanism is forced inwardly to engage the gear teeth carried by the dial member 29 with the corresponding gear teeth carried by the gears associated with the particular oven desired. Upon further rotation of the selecting mechanism, the individual dial corresponding to the oven selected will be rotated until the desired temperature indication appears at the opening, corresponding to the opening 54 of oven No. 1. The selecting mechanism is then released, and the teeth 30 are disengaged. The temperature selected will be maintained in the particular oven regardless of the variation of temperature in any of the surrounding ovens, and the selecting mechanism can be utilized for regulating the temperatures in any of the other ovens without in any way affecting the regulation of the temperature in the previously selected oven.

It is therefore apparent that I have provided an oven heat regulator which is capable of regulating the temperature in any of the ovens to which it is connected without affecting the temperature being maintained in the adjacent oven. Further, the regulating mechanism is compact and may be placed in any desired position upon the oven, there being only one projecting control knob extending from the surface of the oven.

I do not intend to be limited to the exact details of construction and operation shown and described in the illustrated embodiment of my invention, but only in so far as defined by the scope and spirit of the appended claims.

I claim:

1. In an oven of the class described, a plurality of oven chambers, control means for controlling the flow of fuel to each of said chambers, and a selecting mechanism for selectively engaging each of said control means to establish a predetermined temperature within each of said ovens.

2. In an oven of the class described, a plurality of oven burners, control means for said burners, and means for selectively engaging a predetermined one of said control means.

3. In an oven of the class described, a plurality of oven burners, a plurality of control means for said burners, means for selectively engaging a desired control means, and thermally sensitive means disposed in proximity to said burners and connected to said control means.

4. In an oven of the class described, a plurality of oven burners, respective control means for each of said burners, a common selecting mechanism adapted to engage selectively a desired control means, and thermally sensitive means for each of said burners and connected to the respective control means.

5. In an oven of the class described, a plurality of oven burners, respective control means for said burners disposed in proximity to each other, a common selecting mechanism adapted to engage any predetermined control means without changing the position of the remaining control means, and thermally sensitive means disposed adjacent said burners and connected for operating said control means in accordance with temperature changes.

6. In combination, in an oven having a plurality of oven chambers, burners for said chambers, a housing disposed adjacent the control panel of said oven, fuel conduits leading from said burner to said housing, a common fuel inlet to said housing, individual control means in said housing for each of said fuel conduits, and means for selectively engaging each of said control means.

7. In combination, in an oven having a plurality of oven chambers, burners for said chambers, a housing disposed in said oven, fuel conduits leading from said burner to said housing, a common fuel inlet to said housing, individual control means in said housing for each of said fuel conduits, means for selectively engaging each of said control means, and thermally sensitive means disposed adjacent said burners and connected to the respective control means.

8. In combination, in an oven having a plurality of oven chambers, burners for said chambers, a housing, fuel conduits leading from said burners to said housing, said housing having a common fuel inlet, individual control means in said housing for each of said conduits, means for selectively engaging each of said control means, and means for indicating the position of each of said control means.

9. In combination, in an oven having a plurality of oven chambers, burners for said chambers, a housing, fuel conduits leading from said burners to said housing, said housing having a common fuel inlet, individual control means in said housing for each of said conduits, means for selectively engaging each of said control means, means for indicating the position of each of said control means, and means for indicating the position of said engaging means.

10. In combination, in an oven having a plurality of oven chambers, burners for said chambers, a housing, fuel conduits leading from said burners to said housing, said housing having a common fuel inlet, individual control means in said housing controlling the flow of fuel to said conduits, and means for selectively engaging each of said control means, said selecting means being axially shiftable to engage and disengage said control means.

11. In combination, in an oven having a plurality of oven chambers, burners for said chambers, a housing, fuel conduits leading from said burners to said housing, said housing having a common fuel inlet, individual control means in said housing controlling the flow of fuel to said conduits, and selecting means for said control means, said selecting means being axially shiftable for engagement with each of said control means, and being rotatably mounted for rotating said control means to vary the setting thereof.

12. A heat regulator for an oven having a plurality of oven chambers comprising a housing, said housing having a plurality of outlets, valve means positioned in each of said outlets, individual control means for each of said valve means, said control means including a rotatable spindle, and means for selectively rotating each of said spindles to vary the position of said valve means.

13. A heat regulator for an oven having a plurality of oven chambers comprising a housing, said housing having a plurality of outlets, valve means disposed in said outlets, individual control means for each of said valve means, said control means including a rotatable spindle having a projecting portion, and means for selectively engaging the projecting portion of said spindle to vary the position of the valve means associated therewith.

14. A heat regulator for an oven having a plurality of oven chambers comprising a housing, said housing having a plurality of outlets, valve means disposed in said outlets, individual control means for each of said valve means, said control means including a rotatable spindle having a projecting portion, and selecting means including an annular member adapted to engage the projecting portion of said spindle to vary the position of the valve means associated therewith.

15. A heat regulator for an oven having a plurality of oven chambers comprising a housing, said housing having a plurality of outlets, valve means disposed in said outlets, individual control means for each of said valve means, said control means including a rotatable spindle having a projecting portion, thermally sensitive means disposed in said oven chambers and connected to said control means, and selecting means including an annular member having a limited portion thereof adapted to engage the projecting portion of said spindle to vary the position of the valve means associated therewith.

16. A heat regulator for an oven having a plurality of oven chambers comprising a housing, said housing having a plurality of outlets, valve means disposed in said outlets, individual control means for each of said valve means, said control means including a rotatable spindle having a projecting portion, and selecting means having a dial member provided with peripheral engaging means for engaging the projecting portion of said spindle to vary the position of the valve means associated therewith.

17. A device of the class described comprising a housing, said housing having a fuel inlet and a plurality of fuel outlets, individual control means disposed in said outlets for controlling the flow of fuel from said inlet to each of said outlets, means for selectively engaging said control means to establish a predetermined flow of fuel through each of said outlets independently of the position of other of said control means, and thermally sensitive means for automatically varying the setting of said control means.

18. In an oven of the class described, a plurality of oven burners, control means for each of said burners and a common selecting mechanism for selectively engaging a desired control means.

19. In combination, a plurality of enclosures, individual means for heating each of said enclosures, control means for each of said heating means, and a common selecting mechanism for selectively engaging a desired control means.

In witness whereof, I hereunto subscribe my name this 1st day of March, A. D., 1932.

WALTER E. SCHIRMER.